Jan. 28, 1964   W. C. WARTH   3,119,990
PRESSURE ALARM FOR SCUBA DIVING APPARATUS
Filed Feb. 8, 1961   2 Sheets-Sheet 1

*INVENTOR.*
WILLIAM WARTH
BY
ATTORNEY

Jan. 28, 1964   W. C. WARTH   3,119,990
PRESSURE ALARM FOR SCUBA DIVING APPARATUS
Filed Feb. 8, 1961   2 Sheets-Sheet 2

INVENTOR.
WILLIAM WARTH
BY
ATTORNEY

United States Patent Office 3,119,990
Patented Jan. 28, 1964

3,119,990
PRESSURE ALARM FOR SCUBA DIVING APPARATUS
William C. Warth, Milwaukee, Wis., assignor to Diving Equipment and Supply Co., Milwaukee, Wis., a corporation of Wisconsin
Filed Feb. 8, 1961, Ser. No. 87,841
3 Claims. (Cl. 340—236)

This invention relates generally to self-contained underwater breathing apparatus, called scuba, and particularly to apparatus for readily checking the supply of air in such apparatus.

The invention comprehends a structure for measuring the supply of air prior to descent by the diver and for signaling the necessity for ascent when the air supply has diminished. This is done by a structure consisting of a water tight chamber enclosing a self-contained energy source which is urged by the load in a calibrated spring against a contact element which is urged in an opposite direction by the pressure obtaining in the air supply tank. When the pressure in the tank falls below a desired safety minimum the contact element closes a circuit to a suitable indicator made as an accessory to the diver's mask and breathing apparatus. According to the invention, the apparatus is checked for air supply by adjusting the load in the calibrated spring, and noting the pressure of the air supply (which is an indication of the amount of the initial supply) by the operation of the signal, and then adjusting the spring corresponding to a lower pressure when the signal will again be actuated to indicate to the diver the need to ascend before the supply is gone, and to give him time sufficient for the ascent to allow the diver to decompress safely. All of ahe structure according to the invention is sealed against the entrance of water to the contact and energy supplying elements, at the same time permitting of the aforesaid calibration.

One of the principal objects of this invention is to provide a structure useful with underwater breathing apparatus which will check the supply of air prior to descent, and which will give a suitable signal to the diver that he should commence his ascent before his air supply runs out.

Another object is to provide apparatus for giving a signal indicating the supply of compressed air in scuba equipment, said apparatus being characterized by a self-contained energy cell which moves in accordance with the pressure of supply air to give a signal to the diver that ascent is necessary.

Yet another object is to provide apparatus for checking the amount of a compressed fluid characterized by a housing communicating with the supply of fluid, and having an energy cell movable by a calibrated spring to a position where a circuit is closed indicating with the calibration the amount of fluid.

Other objects and important features of the invention will be apparent from a study of the following specification taken with the drawings, which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

Figure 1:
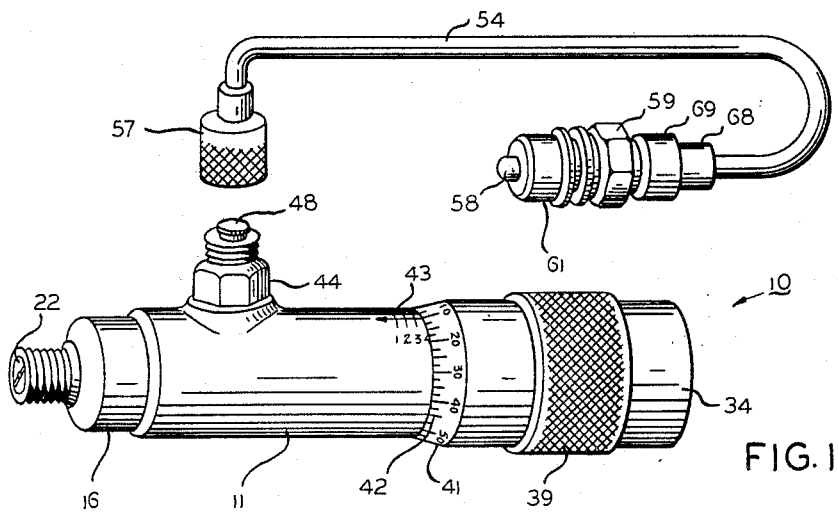
FIG. 1 is a perspective view of the apparatus embodying the improvements according to the present invention.
Figure 2:
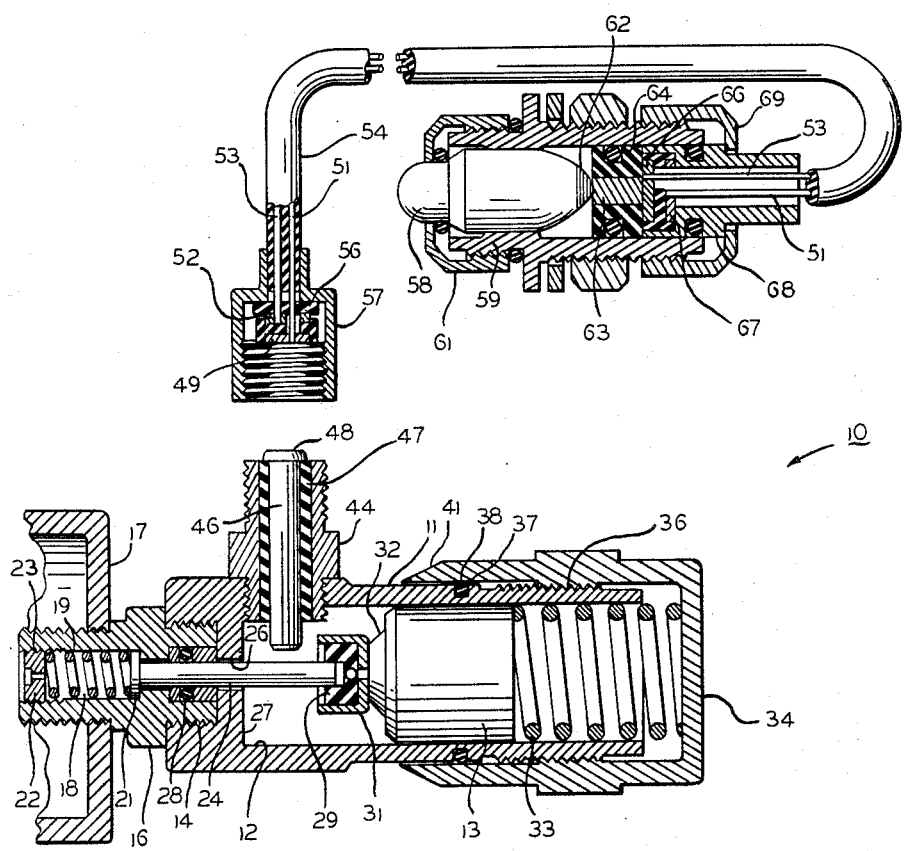
FIG. 2 is a longitudinal cross sectional view thereof.

Referring now particularly to FIGS. 1 and 2 of the drawings, the improved apparatus according to the present invention is referred to generally by the reference numeral 10 and includes a generally cylindrical housing 11 having a cylindrical bore 12 therein receiving a self-contained source of energy, such as a cell 13, which may preferably be of the mercury type. The housing 11 is tapped as at 14 to receive a fitting 16 which is threaded into a tank 17 containing compressed air. The fitting 16 has a cylindrical passageway 18 therein, and a light spring 19 is constrained in the passageway 18 between a piston 21 and an abutment 22 which is threaded as at 23, so that the pressure of the supply 17 is directed against the piston 21.

The piston 21 has a piston rod 24 which extends into the bore 12, and is guided in an opening 26 in an end wall 27 of the housing 11. Suitable packings 28 are provided in the fittings 16 for the piston rod 24.

The end of the piston rod 24 extending within the chamber 12 has an insulating washer 29 thereon which supports a contact element 31, and the pressure within the supply tank 17 biases the contact 31 against a terminal 32 of the cell 13.

Structure is provided for balancing the pressure within tank 17 against the piston 21, and to this end a calibrated spring 33 is bottomed at one end against the cell 13 and at its other end against a closure cap 34 which is threaded at 36 to one end of the housing 11. An O-ring seal 37 is retained in a slot 38 in the outside of the housing 11 and effects a seal between the housing 11 and closure 34 against the entrance of water.

As seen in FIG. 1, the closure 34 has a knurled surface 39 and a tapered surface 41 which has graduations 42 thereon which cooperate with graduations 43 on the housing 11, so that the load in the spring 33 can be suitably adjusted.

The housing 11 has a fitting 44 threaded thereto which supports a terminal member 46 insulated from the fitting 44 by an insulating sleeve 47. The terminal member 46 has a contact 48 adapted to make contact with a terminal 49 formed on the end of a lead 51 and insulated from a terminal 52 on a second lead 53, the two leads 51 and 53 being suitably held in a sheath 54. Terminal 52 is in contact with a conductor member 56 supported between terminal 52 and a connector 57 which is threaded onto fitting 44.

The two leads 51 and 53 are adapted to be connected to a signal lamp which can be supported in a divers mask to give an indication of a condition of pressure obtaining in the tank 17. The lamp 58 is accordingly held in a water tight receptacle 59, having a closure cap 61 through which the lamp 58 extends, the lamp 58 having a contact 62 in contact with a terminal member 63. A sleeve 64 of insulating material insulates the terminal 63 from the housing 59, and is in contact with a terminal 66 connected to the lead 53. A terminal 67 is also connected to the lead 51 and is in contact with a terminal housing 68 held in position in the housing 59 by an end closure 69 threaded to the housing 59.

Figure 3:
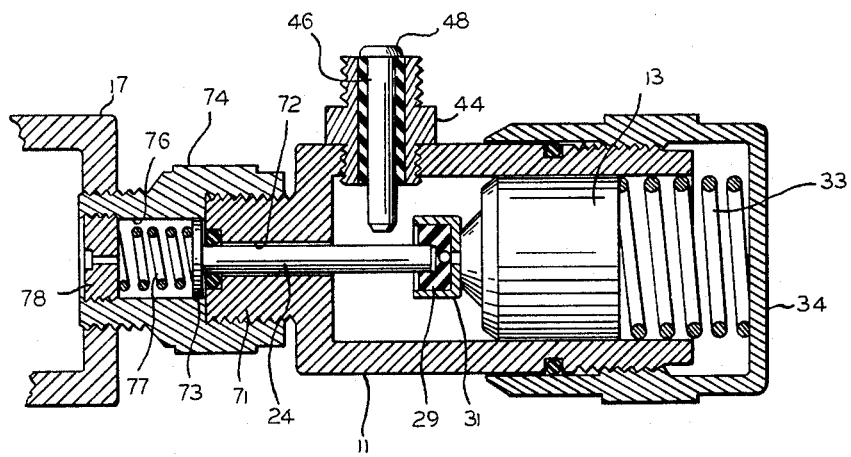
FIG. 3 is a longitudinal sectional view of a modified construction.

Referring now to FIG. 3 of the drawings, there is shown another embodiment of the invention characterized by the housing 11 having a threaded extension 71 therefrom with a passageway 72 providing a guide for the piston rod 24. In this embodiment of the invention, the piston rod 24 has a piston 73 which is enclosed within a male-female connection 74 which is threaded to the supply tank 17, there being a passageway 76 in the connector 74 to accommodate the piston 73. Spring 77 lightly biases the piston 73 and the piston rod 24 to the right and is constrained between the piston 73 and a trained plug 78.

As with the embodiment seen in FIG. 2, the piston 73 is exposed to the pressure within the supply tank 17 at all times.

In using apparatus according to the present invention, the user desirably first checks the amount of compressed fluid within the tank 17 by determining the pressure thereof, the pressure being an indication of the amount of such pressure fluid. By turning the closure 34 to load the spring 33 and move the energy cell 13 to the left, the contact member 31 will come into contact with the terminal 46 to complete a circuit through the cell 13 and the signal lamp 58. The pressure within the tank 17 may then be noted.

The signal lamp 58 can be lighted to indicate a lower pressure within the tank 17, and the closure 34 is turned on the housing 11 to load the spring 33 to a smaller amount and cause the pressure within the tank 17 to shift the cell 13 to the right, the graduated dials 42 and 43 being set to a position corresponding to such lower value of pressure. As the value of pressure decreases, the spring elongates, shifting the cell 13 and contact element 31 to the left and when contact is again made with the terminal 46, a circuit will be closed to the lamp 58 once more indicating the amount of such lower pressure.

When the device is used as a part of scuba equipment, the diver can first check the amount of compressed air in the supply tank 17, and prior to his descent set the closure 34 and the dials 42, 43 to a pressure corresponding to the depth in which he operates, and to a pressure which will provide enough air for an ascent at the proper rate so that decompression is done properly. When the driver works at the selected depth and the supply of air in the tank 17 falls to such level which will permit him to have necessary time for ascent, the signal lamp 58 will be illuminated to indicate that the time for ascent is at hand. As was described, the signal lamp is generally disposed in the vicinity of the mask and face equipment, so that the diver can see the signal indicating the time for ascent.

While the invention has been described in terms of a preferred embodiment thereof, its scope is intended to be limited only by the claims here appended.

I claim:

1. Apparatus for scuba divers for giving a signal indicating the amount of compressed air comprising a housing including a connection from said housing to a supply of compressed air, an energy cell shiftable in said housing, a piston supported by said housing and including a contact carried thereon contacting said energy cell and urged against said energy cell by the pressure of said compressed air, a spring within said housing biasing said energy cell against said contact, a closure threaded to said housing and cooperating with said spring, and including calibrations on said housing and said closure related to the load in said spring, a terminal extending within said housing and adapted to be contacted by said contact when the pressure against said piston drops to a pre-determined level, and signal means connected to said terminal including a circuit made through said signal means and said energy cell when said contact engages said terminal.

2. Apparatus for scuba divers for giving a signal indicating the amount of compressed air comprising a housing including a connection from said housing to a supply of compressed air, an energy cell shiftable in said housing and having electrical contact therewith, a piston, supported by said housing and including a contact carried thereon contacting a terminal of said energy cell and urged against said terminal by the pressure of said compressed air, a spring within said housing biasing the terminal of said energy cell against said contact, a closure threaded to said housing and cooperating with said spring, and including calibrations on said housing and said closure related to the load in said spring, a terminal member extending within said housing and adapted to be contacted by said contact when the pressure of said supply drops to a pre-determined level, and signal means connected to said terminal member including a circuit made through said signal means and said energy source when said contact engages said terminal member.

3. Apparatus for scuba divers for giving a signal indicating the amount of compressed air comprising a watertight housing including a connection from said housing to a supply of compressed air, a battery cell shiftable in said housing and having electrical contact therewith, a piston supported by said housing and including a contact carried thereon contacting a terminal of said battery cell and urged against said terminal by the pressure of said compressed air, resilient means within said housing biasing said battery cell against said contact, a closure threaded to said housing and cooperating with said resilient means, and including calibrations on said housing and said closure related to the load of said resilient means, a terminal member extending within said housing and adapted to be contacted by said contact when the pressure against said piston drops to a pre-determined level, and signal means remote from said housing and having a lead therefrom connected to said terminal member including a circuit made through said signal means and said battery cell when said contact engages said terminal member.

References Cited in the file of this patent

UNITED STATES PATENTS

| | | |
|---|---|---|
| 1,928,732 | Muir | Oct. 3, 1933 |
| 1,950,532 | Wasson | Mar. 13, 1934 |
| 2,749,536 | Sperling | June 5, 1956 |
| 2,801,409 | Sperling | July 30, 1957 |
| 2,978,690 | Kurie et al. | Apr. 4, 1961 |

OTHER REFERENCES

Premax Flyer, "Engine Pressure Indicator," mfg. by Bacharach Industrial Instrument Co., Bulletin 272, 700 Bennett Street, Pittsburgh, Pa.